(12) United States Patent
Déjean

(10) Patent No.: US 8,645,819 B2
(45) Date of Patent: Feb. 4, 2014

(54) DETECTION AND EXTRACTION OF ELEMENTS CONSTITUTING IMAGES IN UNSTRUCTURED DOCUMENT FILES

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 48 days.

(21) Appl. No.: 13/162,858

(22) Filed: Jun. 17, 2011

(65) Prior Publication Data

US 2012/0324341 A1 Dec. 20, 2012

(51) Int. Cl.
*G06F 17/00* (2006.01)

(52) U.S. Cl.
USPC ........................................... 715/243; 715/200

(58) Field of Classification Search
USPC .................... 715/200, 246–247, 243
See application file for complete search history.

(56) References Cited

U.S. PATENT DOCUMENTS

| | | | |
|---|---|---|---|
| 7,392,473 B2 | 6/2008 | Meunier | |
| 7,693,848 B2 | 4/2010 | Déjean et al. | |
| 7,739,587 B2 | 6/2010 | Vion-Dury | |
| 7,852,499 B2 | 12/2010 | Déjean | |
| 7,853,871 B2 * | 12/2010 | Simons et al. | 715/238 |
| 7,937,653 B2 | 5/2011 | Déjean et al. | |
| 2006/0117268 A1 * | 6/2006 | Talley et al. | 715/769 |
| 2006/0155703 A1 | 7/2006 | Déjean | |
| 2006/0156226 A1 | 7/2006 | Déjean et al. | |
| 2008/0084573 A1 * | 4/2008 | Horowitz et al. | 358/1.13 |
| 2010/0174980 A1 * | 7/2010 | Mansfield et al. | 715/234 |
| 2010/0269064 A1 * | 10/2010 | Lobregt et al. | 715/810 |
| 2013/0125002 A1 * | 5/2013 | Spaeth et al. | 715/731 |

OTHER PUBLICATIONS

Shao, et al. "*Graphics Recognition in PDF documents*," in Sixth Intern'l Soc. Pattern Recognition (IAPR) International Workshop on Graphics Recognition, 2005.
Faure, et al. "*Detection of figure and caption pairs based on disorder measurements*", in Proc. Intern'l Soc. for Optics and Photonics (SPIE) 7534, 75340S, pp. 1-10, 2010.
Shaifat, et al. "Document cleanup using page frame detection," IJDAR 2008, pp. 81-96.
http://sourceforge.net/projects/pdf2xml/—accessed Jun. 15, 2011.
U.S. Appl. No. 12/719,982, filed Mar. 9, 2010, Meunier, et al.
U.S. Appl. No. 12/773,125, filed May 4, 2010, Déjean.
U.S. Appl. No. 12/853,461, filed Aug. 10, 2010, Déjean, et al.
U.S. Appl. No. 12/892,138, filed Sep. 28, 2010, Déjean.
U.S. Appl. No. 12/974,843, filed Dec. 21, 2010, Déjean.

* cited by examiner

*Primary Examiner* — Manglesh M Patel
(74) *Attorney, Agent, or Firm* — Fay Sharpe LLP

(57) ABSTRACT

A method and a system for detecting and extracting images in an electronic document are disclosed. The method includes receiving an electronic document and identifying elements of a page. The identified elements include a set of graphical elements and a set of text elements. The method may include identifying and excluding elements which serve as graphical page constructs and/or text formatting elements. The page can then be segmented, based on (remaining) graphical elements and identified white spaces, to generate a set of image blocks. Text elements that are associated with a respective image block are identified as captions. Overlapping candidate images are then grouped to form a new image. The new image can thus include candidate images which would, without the identification of their caption(s), each be treated as a respective image.

27 Claims, 10 Drawing Sheets

```
<TEXT width="371.904" height="39.852" id="p1_t4" x="146.8" y="428.124">
  <TOKEN sid="p1_s16" id="p1_w6" font-name="timesnewromanps" x="46.8" y="428.124" base="460.2" width="171.888" height="39.852">Description</TOKEN>
  <TOKEN sid="p1_s17" id="p1_w7" font-name="timesnewromanps" x="27.7" y="428.124" base="460.2" width="29.988" height="39.852">of</TOKEN>
  <TOKEN sid="p1_s18" id="p1_w8" font-name="timesnewromanps" x="66.7" y="428.124" base="460.2" width="152.004" height="39.852">Functions</TOKEN>
</TEXT>
```

*FIG. 4*

```
<IMAGE id="p2_i1" x="70.6" y="689.1" width="184.7" height="48.7" href="0314CG-
DescriptionOfFunctions.xml_data/image - 2.ppm"/>
```

FIG. 5

```
<GROUP id="p1_s2" closed="true">
  <M x="0" y="792"/>
  <L x="612" y="792"/>
  <L x="612" y="0"/>
  <L x="0" y="0"/>
  <L x="0" y="792"/>
</GROUP>
```

FIG. 6

```
<CLIP>
  <GROUP id="p1_s1" closed="true">
  <M x="0" y="792"/>
  <L x="612" y="792"/>
  <L x="612" y="0"/>
  <L x="0" y="0"/>
  <L x="0" y="792"/>
  </GROUP>
</CLIP>
```

FIG. 7

DETECTION AND EXTRACTION OF ELEMENTS CONSTITUTING IMAGES IN UNSTRUCTURED DOCUMENT FILES

BACKGROUND

The exemplary embodiment relates to document processing. It finds particular application in extraction of elements which together constitute an image from a PDF document.

Page description languages, such as the portable document format (PDF) standard, define a set of elements which can be used individually or in combination to compose the pages of a document. These include text elements, raster graphics, and vector graphics, among others. A raster graphic, called an Image Xobject in PDF terminology, is represented by a dictionary describing properties of an image with an associated data stream, which contains the image data. Vector graphics, sometimes referred to as vectorial instructions, are based on mathematical equations, and include points, lines, curves, and regular shapes.

An image, or rather, what a human reader considers as one image, can be composed of a combination of these elements. A simple case is when one image is composed of one raster element in the PDF. In some cases, several raster images can be used to build "one" image. Vector graphics are also used, alone or with text elements, but also in combination with raster graphics.

One problem which arises is that the PDF standard does not define an image structure. This means that elements composing one image are rendered independently. The detection of the "final" image is thus done by the human reader. Hence automatic recognition of images, and the elements which compose them, is difficult.

It would be advantageous to have a document analysis system which could process such files and regroup the different elements corresponding to one image for presentation to a user, separately from the entire document, for example.

Methods for processing graphical elements in documents are disclosed, for example, in Mingyan Shao and Robert P. Futrelle, *Graphics Recognition in PDF documents*, in Sixth Intern'l Soc. Pattern Recognition (IAPR) International Workshop on Graphics Recognition (GREC 2005), Hong Kong, 2005; and Claudie Faure and Nicole Vincent, *Detection of figure and caption pairs based on disorder measurements*, in Proc. Intern'l Soc. for Optics and Photonics (SPIE) 7534, 75340S, pp. 1-10, 2010. In the first reference, the authors aim to extract sub-diagrams using horizontal and vertical separating white spaces, but do not consider sub-diagrams as a whole diagram. The second reference describes a method for extracting figures and associated captions from scanned documents from the 19th century using the geometrical relation between a figure and its caption. However, the method is unable to detect figure-caption pairs in contemporary scientific documents when a figure is a mixture of small geometrical objects, graphic lines, and text lines, as it is often the case.

OCR engines also offer a partial solution to this problem. They rely on a zoning step. Zoning in OCR is the process of creating zones that correspond to specific attributes of a page element. A zone can be identified as a non-text graphic, alpha-numeric, or numeric. While effective for stand-alone photographs, diagrams are challenging for OCR processing.

Some tools, such as pdf2svg (available on the website pdftron.com) convert a PDF file into the SVG (support vector graphic) format. However, this process simply rewrites the PDF instructions into SVG ones, thereby generating an "image" of the entire page without any sub-structure.

The exemplary system, method, and computer program product address the problem of identifying images in PDF documents which allow them to be extracted or otherwise distinguished from other content of a page.

INCORPORATION BY REFERENCE

The following references, the disclosures of which are incorporated herein by reference in their entireties, are mentioned:

U.S. application Ser. No. 12/719,982, filed Mar. 9, 2010, entitled DOCUMENT ORGANIZING BASED ON PAGE NUMBERS, by Jean-Luc Meunier, et al.; U.S. application Ser. No. 12/773,125, filed May 4, 2010, entitled SYSTEM AND METHOD FOR UNSUPERVISED GENERATION OF PAGE TEMPLATES, by Hervé Déjean; U.S. application Ser. No. 12/853,461, filed Aug. 10, 2010, entitled OPTICAL CHARACTER RECOGNITION WITH TWO-PASS ZONING, by Hervé Déjean and Jean-Luc Meunier; U.S. application Ser. No. 12/892,138, filed Sep. 28, 2010, entitled SYSTEM AND METHOD FOR PAGE FRAME DETECTION, by Hervé Déjean; U.S. application Ser. No. 12/974,843, filed on Dec. 21, 2010, entitled SYSTEM AND METHOD FOR LOGICAL STRUCTURING OF DOCUMENTS BASED ON TRAILING AND LEADING PAGES, by Hervé Déjean; U.S. Pub. No. 20060155703, published Jul. 13, 2006, entitled METHOD AND APPARATUS FOR DETECTING A TABLE OF CONTENTS AND REFERENCE DETERMINATION, by Hervé Déjean, et al.; U.S. Pat. No. 7,392,473, issued Jun. 24, 2008, entitled METHOD AND APPARATUS FOR DETERMINING LOGICAL DOCUMENT STRUCTURE, by Jean-Luc Meunier; U.S. Pat. No. 7,693,848, issued Apr. 6, 2010, entitled METHOD AND APPARATUS FOR STRUCTURING DOCUMENTS BASED ON LAYOUT, CONTENT AND COLLECTION, by Hervé Déjean, et al.; U.S. Pat. No. 7,739,587, issued Jun. 15, 2010, ENTITLED METHODS AND APPARATUSES FOR FINDING RECTANGLES AND APPLICATION TO SEGMENTATION OF GRID-SHAPED TABLES, by Jean-Yves Vion-Dury; U.S. Pat. No. 7,852,499, issued Dec. 14, 2010, entitled CAPTIONS DETECTOR, by Hervé Déjean; and U.S. Pat. No. 7,937,653, issued May 3, 2011, entitled METHOD AND APPARATUS FOR DETECTING PAGINATION CONSTRUCTS INCLUDING A HEADER AND A FOOTER IN LEGACY DOCUMENTS, by Hervé Déjean, et al.

BRIEF DESCRIPTION

In accordance with one aspect of the exemplary embodiment, a method for detecting images in an electronic document including receiving an electronic document comprising a plurality of pages and, for each of at least one of the pages of the document, identifying elements of the page, the elements including a set of graphical elements and a set of text elements. Optionally, the method includes identifying and excluding, from the set of graphical elements, graphical elements which serve as graphical page constructs and/or text formatting elements. The page is segmented, based on graphical elements in the set of graphical elements, to generate a set of image blocks, each of the image blocks comprising at least one of the graphical elements. The method further includes computing whether a text element from the set of text elements is associated with a respective image block in the set of image blocks and forming candidate images, each candidate image including an image block and, for a text element from the set of text elements which is determined to be associated with a respective image block, a respective one of the candidate images further including the associated text element. For a pair of the candidate images which are determined to be overlapping, the method includes grouping the pair of overlapping candidate images to form a new image. One or more steps of the method may be performed with a computer processor.

In another aspect, a system for detecting images in electronic documents includes a graphical page constructs detector configured for identifying graphical elements of a page of an electronic document which serve as graphical page constructs, a graphical element segmentor which segments the page to generate a set of image blocks, each of the image blocks comprising at least one of the graphical elements, excluding any graphical elements identified as serving as a page construct, a related text detector configured for associating text elements from a set of text elements for the page with respective image blocks in the set of image blocks, and a refinement module for forming candidate images, each candidate image comprising an image block and any text elements from the set of text elements which are determined to be associated with that image block and for grouping any candidate images which overlap to form a new image.

In another aspect, a method for detecting images in an electronic document includes, for each page of a plurality of pages of an electronic document, identifying elements of the page, the elements including a set of graphical elements and a set of text elements, automatically excluding, from the set of graphical elements for the page, any graphical elements which are determined to serve as at least one of graphical page constructs and text formatting elements, and thereafter, segmenting the page, based on remaining graphical elements in the set of graphical elements, to generate a set of image blocks, each of the image blocks comprising at least one of the remaining graphical elements. The method includes automatically associating any text elements from the set of text elements with respective image blocks in the set of image blocks which are determined to serve as captions for the respective image blocks, wherein no text box is associated with more than one respective image block, and forming candidate images, each candidate image comprising one of the image blocks and its caption, if any. The method further includes computing overlap between candidate images arising from the association of a text element with an image block and grouping any candidate images which are determined to have an overlap to form a new image.

BRIEF DESCRIPTION OF THE DRAWINGS

FIG. 4 illustrates a XML text tag;

FIG. 5 a raster graphic tag;

FIG. 6 a vector graphic tag; and

FIG. 7, a clipping tag which may be utilized in the exemplary method;

DETAILED DESCRIPTION

Aspects of the exemplary embodiment relate to an apparatus and a method for detection and extraction of graphical elements in page description language documents, such as PDF files.

Working on a set of graphical elements and text elements assigned to a page of a document, the exemplary method first detects those graphical elements of the page corresponding to page constructs, such as headers and footers. Then, a segmentation algorithm is applied over the remaining graphical elements (raster graphics, and vector graphics). Related text is associated with the resulting images. Geometrical relations between text and images are used in order to refine the image segmentation (by merging images). The exemplary method shows good results on PDF documents.

Figure 1:
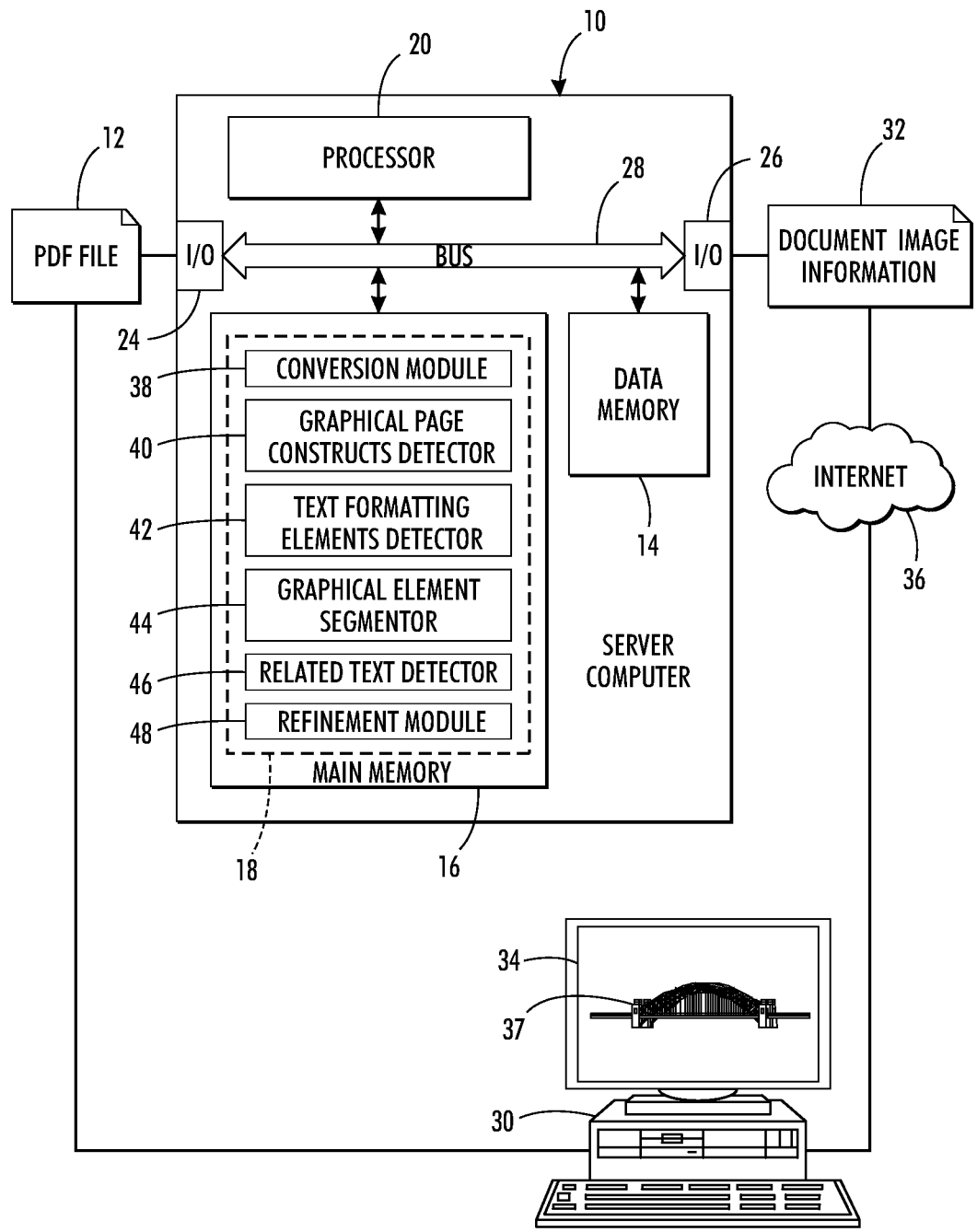
FIG. 1 is a functional block diagram of a system for processing electronic documents, such as PDF files, in accordance with one aspect of the exemplary embodiment.

FIG. 1 illustrates an exemplary apparatus 10 for processing documents, which may include one or more specific or general purpose computing devices. The apparatus 10 receives, as input, an unstructured document 12 and stores the document in memory 14 during processing. The document 12 is received in electronic form and can be a technical manual, book, journal publication, or the like. The exemplary document 12 is in a page description language, such as a PDF, Portable Document Format (Adobe Systems) file, although other unstructured documents are also contemplated, such as PostScript (Adobe Systems), PCL, Printer Command Language (Hewlett-Packard), such as PCL-5, PCL-5E, PCL-6, PCL-XL, and the like. In PDF, for example, each page of a document is assigned a set of elements, such as text elements and graphical elements, and their respective sizes and locations are identified in a job ticket. The exemplary document 12 is a multi-page document, which allows information from multiple pages to be used in extraction of images from a page.

Main memory 16 of the apparatus 10 stores instructions 18 for performing the exemplary method. These instructions 18 are implemented by an associated processor 20, such as the computer 10's CPU. The computer communicates with external devices via one or more input/output devices 24, 26. The components 14, 16, 20, 24, 26 are communicatively linked by a data/control bus 28.

While a collection of documents could be processed, rather than a single PDF document 12, the exemplary method is best suited to processing documents singly. Prior to inputting, the document pages may be stored in any suitable tangible storage media such as a disk, ROM or RAM, or may be input into the system 10 in the form of a carrier wave, e.g., via the Internet. The input device 24 and/or 26 may include a modem link, a wired or wireless connection, USB port, floppy or hard disk receiver, or the like and may be separated or combined with other components of the system 10. While the illustrated source of the document 12 is a client computing device 30

(which may be similarly configured to computer 10, except as noted), it will be appreciated, that the document may be input from a scanner, or other digital image capture device, with an associated Optical Character Recognition (OCR) engine for processing the output of the scanner to generate the pages of document 12.

The system may comprise one or more computing devices 10, 30 such as a personal computer, PDA, laptop computer, server computer, or combination thereof. Memories 14, 16 may be integral or separate and may represent any type of computer readable medium such as random access memory (RAM), read only memory (ROM), magnetic disk or tape, optical disk, flash memory, or holographic memory. In one embodiment, the memories 14, 16 comprise a combination of random access memory and read only memory. In some embodiments, the processor 20 and memory 14, 16 may be combined in a single chip.

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 10, executes instructions stored in memory 16 for performing the method outlined in FIG. 2.

The apparatus 10 may output information 32, specifically, document image information, to an output device, such as a display device 34, such as a screen, or a hardcopy output device, such as a printer, or the like. The output device 34 may be connected directly with the system or linked thereto, e.g., via a wired or wireless link 36, such as a local area network, wide area network, or the Internet. The system 10 may generate a graphical user interface (GUI) 37 for display to a user. The exemplary GUI enables a user to interact with the system 10 via the display screen 34 with a user input device, such as a cursor control device, keyboard, keypad, joystick, touchscreen, or the like. In the exemplary embodiment display screen 34 is linked to the client computing device 30 and device 30 includes a web browser which allows the user to interact with the apparatus 10.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 18 may be in the form of hardware or a combination of hardware and software and may include a conversion module 38, a graphical page constructs detector 40, optionally, a text formatting elements detector 42, a graphical element segmentor 44, a related text detector 46, and a refinement module 48. As will be appreciated, system 10 may include fewer or more components while still having the same functionality. For example, components 38, 40, 42, 44, 46, 48 may be combined to form fewer components, or may be functionally separated to form more individual components. These components are best understood with reference to the exemplary method, which is described with reference to FIG. 2. Briefly, the conversion module 38 converts the page description language document 12 to a markup language (e.g., XML) document, if not already in this format. The graphical page constructs detector 40 detects those graphical elements which are page construct graphical elements forming a part of a page construct, such as headers and footers. The text formatting elements detector 42, if used, detects those graphical elements (typically vector graphic elements), logically associated with text, e.g., forming a part of tables and textual frames (e.g., text boxes). The graphical element segmentor 44 uses a segmentation algorithm to segment the page containing the remaining graphical elements to generate image blocks. The related text detector 46 detects text associated with these image blocks to generate candidate images. The refinement module 48 corrects for over-segmentation and generates an image by combining overlapping candidate images, where found.

Figure 3:
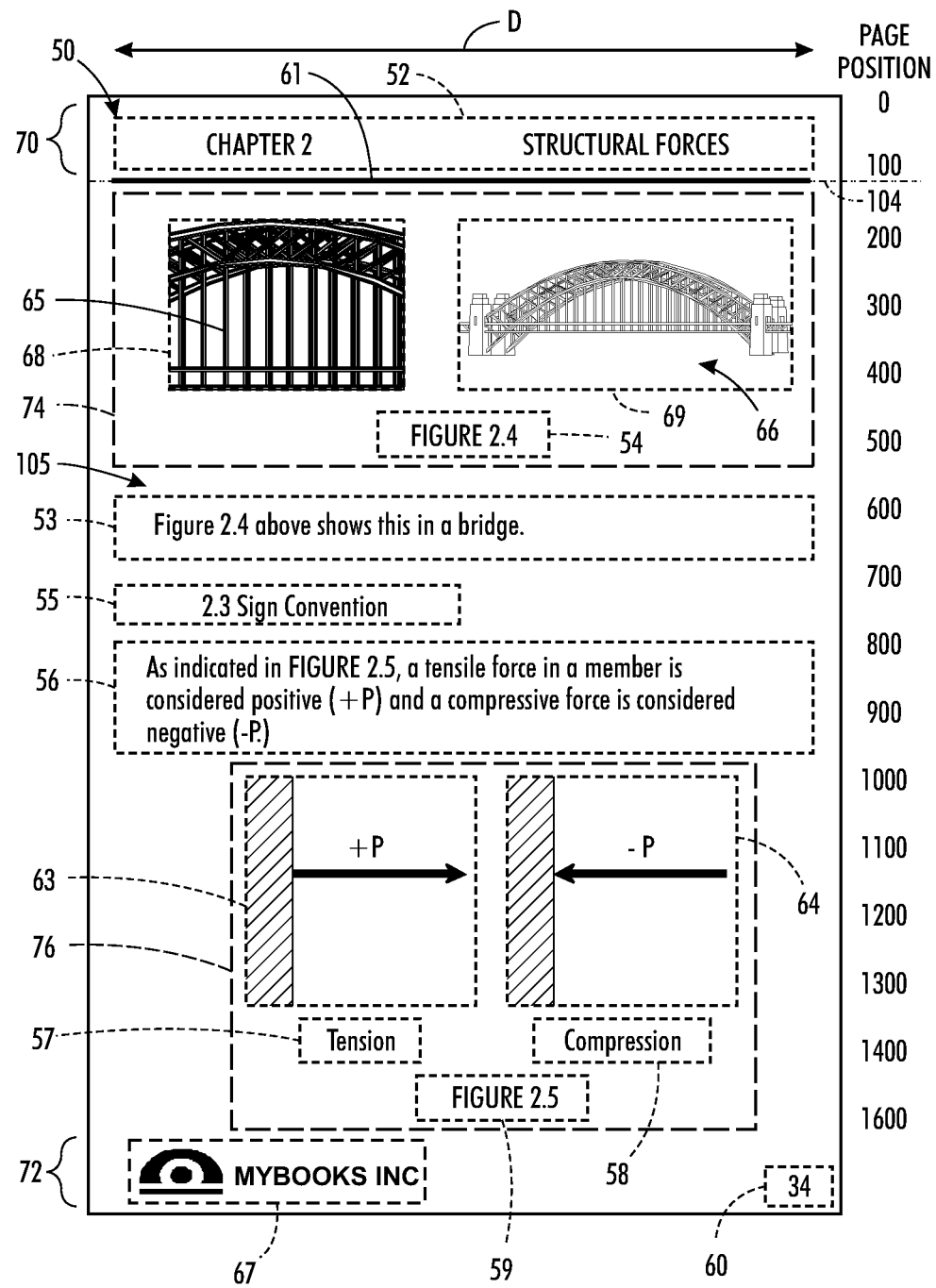
FIG. 3 is an illustrative document, showing how different graphical and text elements can be combined to form an image.

FIG. 3 illustrates an exemplary page 50 of a document 12 for illustrating aspects of the method. The page 50 includes several elements including text elements, vector graphics, and raster graphics. The text elements are indicated at 52, 53, 54, 55, 56, 57, 58, 59, and 60. Each of these text elements includes one or more line elements, each line element being a single line of text (in some cases, line elements, rather than blocks of text, are identified). A set of vector graphic elements includes a line 61, a single arrow 62, and two groups of vectorial instructions 63, 64, which each include lines and an arrow. All the vectorial instructions from a page may be grouped into a single set of vectorial instructions, it it is difficult to know which elements should be grouped as one image. Three raster graphic elements 65, 66, 67 are also shown. Their boundaries or "clipping zones" 68, 69 are shown as dotted lines for illustration purposes. Two of the graphical elements, line 61 and logo 67, form a part of a respective page construct 70, 72, which in this case, correspond to a header and a footer of the document. Each page construct 70, 72 is detectable as it appears on at least several pages of the document 12.

An aim of the exemplary method is to extract, for each page 50 of a document 12, any images 74, 76, which are present, each image comprising at least one graphical element and any related text, but excluding any graphical page construct elements 61, 67 and unrelated text. From the information in the PDF file 12, however, there is no indication, for example, as to whether the line 61 forms a part of the image 74, i.e., what a user would consider as part of this image and may want to extract from the page as an image. The exemplary system and method address this problem and others on the extraction of images 74, 76.

Figure 2:
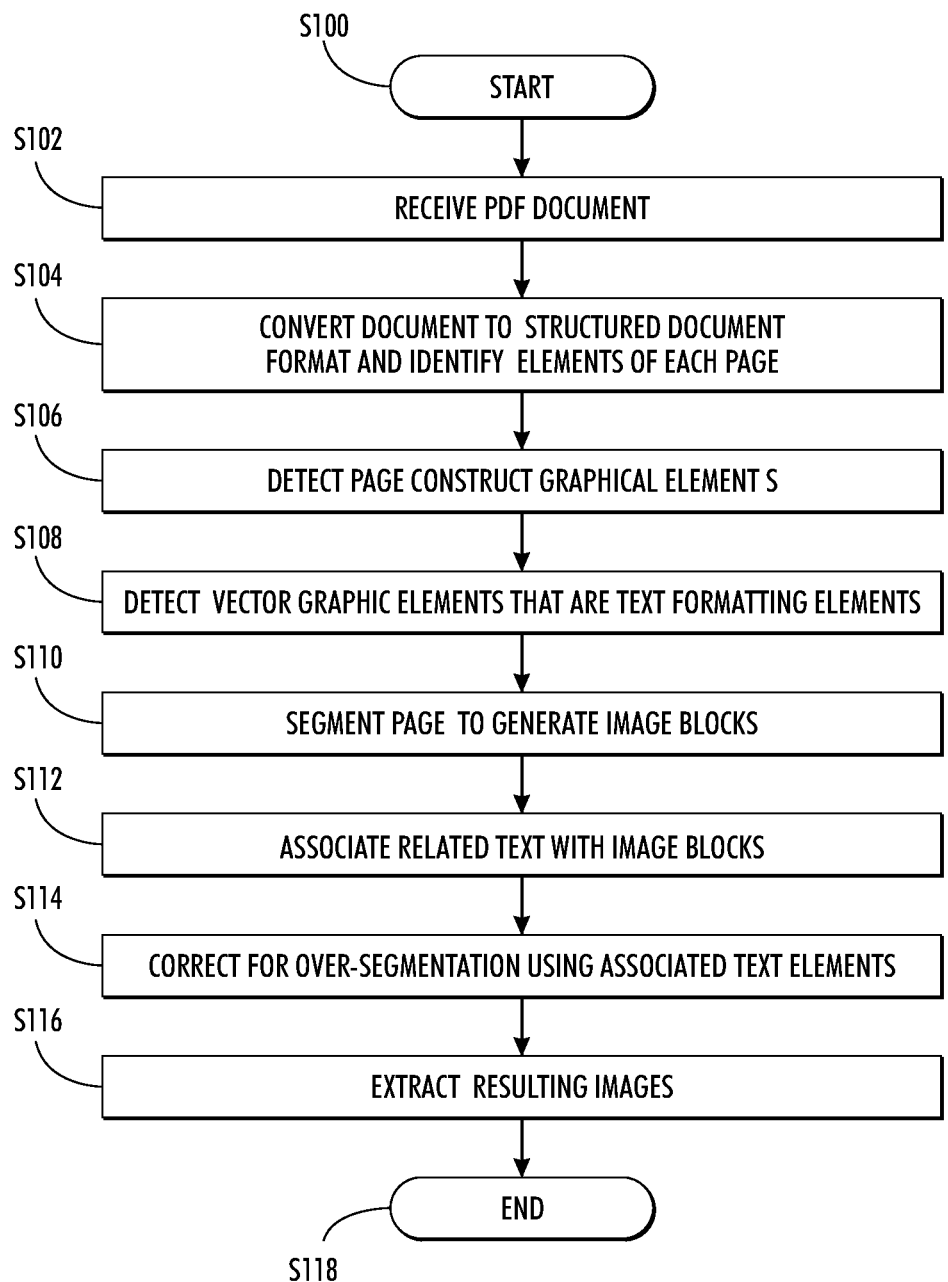
FIG. 2 is a flow diagram illustrating a method for processing electronic documents, in accordance with one aspect of the exemplary embodiment.

With reference now to FIG. 2, a method for extracting images from an unstructured document 12, such as a PDF file, is illustrated. The method begins at S100.

At S102, an unstructured document 12, e.g., in a PDF format, is input to the apparatus and stored in memory 14.

At S104, the document 12 is converted by the conversion module 38 into an alternative language format, such as XML or other structured format. A set of graphical elements and a set of text elements are associated with each page 50 of the document (for some document pages, one or both of these sets may be an empty set).

At S106, any graphical elements serving as graphical page constructs 61, 67 of a page are detected by considering multiple document pages and are removed from consideration as candidate image elements (elements that may constitute a "sub-image" or an image).

At S108, any graphical elements serving as text formatting elements are detected are removed from consideration as candidate image elements. The text formatting elements are vector graphic elements that are used to format text, such as table frames and text boxes.

At S110, the page is segmented. In this step, remaining graphical elements of the page, after extraction of any text formatting and page construct elements, are segmented into image blocks, which in some cases, may be sub-images.

At S112 those text elements ("captions") that are related to an image block are detected and linked to a related image block. A candidate image is generated with a bounding box which is the smallest rectangle to encompass the graphical element(s) of the image block and its linked text element(s), if any.

At S114, correction of over-segmented sub-images is performed using the linked text elements by computing overlap of bounding boxes of candidate images including these elements.

At S116, the resulting images, each image comprising at least one graphical element and any linked text, may be extracted from the rest of the document, labeled with an appropriate image label, stored in memory, output to an external device, and/or otherwise processed.

The method ends at S118.

In the exemplary embodiment, in order to solve the segmentation problem, the initial segmentation at S110 favors over-segmentation, rather than under-segmentation (potentially merging two images), and the correction of the over-segmentation is then dealt with in the further segmentation step at S114.

The method illustrated in FIG. 2 may be implemented in a non-transitory computer program product that may be executed on a computer. The computer program product may include a non-transitory computer-readable recording medium on which a control program is recorded (stored), such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method.

The system and method can use, as resources, some of the tools described in U.S. Pat. Nos. 7,852,499, 7,392,473, 7,739, 587, as described in further detail below.

1. Preprocessing (S104)

In the preprocessing step, the PDF file 12 is considered as input and converted to a structured document format by conversion module 38 using suitable conversion processing software, such as pdf2xml (available at http://sourceforge.net/projects/pdf2xml/). Information contained in the PDF file 12 is extracted and converted into any suitable markup language, such as XML, SGML, XML, HTML, or the like. XML allows the delivery of structured data in a standard, consistent way. XML is a complementary format to HTML and both are derived from the Standard Generalized Markup Language (SGML); however, unlike HTML, XML does not have a fixed vocabulary.

SGML and XML, for example, are both text-based formats that provide mechanisms for describing document structures using markup elements or tags (words surrounded by "<" and ">").

In the preprocessing, a text element 52 is represented, for example, by a TEXT tag 80 of the type illustrated in FIG. 4. The tag starts and/or ends with a tag type descriptor 82, which in this case is TEXT. Dimensions of the text element frame are then specified, such as its width (width="371.904") and height (height="39.852"), and relative position on the page, such as by defining a position of one corner, e.g., the top left, relative to a corner (top left) of the page (x="146.8" y="428.124"). An identifier for the text which identifies the page number on which it is located and a reference number of the text element is provided (here, id="p1_t4", indicates the first page and $4^{th}$ text element). The text content 84 of the text element (here, Description of Functions) is specified as a sequence of TOKENS, which include the dimensions and font type to be used in rendering the text. Here the three words each appear on a separate line and thus have a respective token. The text content 84 is the only part of the text tag 80 which the viewer will see (displayed on a screen or printed on a page), and is delimited by beginning and end symbols > and </.

A raster graphic element, such as element 65, is represented by an IMAGE tag 86, as illustrated in FIG. 5. Here, IMAGE simply references a raster graphic image, not the image which the method seeks to identify. The tag 86 starts and/or ends with a tag type descriptor 88 such as IMAGE. As for the text tag, an identifier which identifies the page number and a reference number of the raster graphic element (id="p2_i1") is provided. Dimensions of the raster graphic element frame are then specified as well as its position on the page. A reference (href) points to the image content itself, here "0314CG-DescriptionOfFunctions.xml_data/image-2.ppm"

A vector graphics element 61 (vectorial instructions), such as a line, regular shape, arrow, or combination thereof, is represented by a GROUP tag 90, with a tag type descriptor 92 such as GROUP, as illustrated in FIG. 6, where M means "MOVE (to)" and L means "(draw) LINE". This exemplary group of instructions, called a path in PDF terminology, draws a rectangle whose height is 792 and width is 612, starting from point (0, 792), in the illustrated example.

A fourth and last element which contributes to the image rendering is a clipping zone, which is defined by a CLIP tag 94, with a tag descriptor 96, as illustrated in FIG. 7. A clipping zone aims at shrinking some elements, generally raster graphic images or vector graphic elements, by delimiting the regions affected by painting operators. A clipping zone is defined by a path (as for vector graphics). FIG. 3 shows examples of clipping zones 68, 69, i.e., what would be shown with Acrobat Reader™ software using the clipping information. The original raster graphic element 66, contained in the PDF file without clipping is wider in this case, and has been clipped at left and right sides. Element 65 is clipped much more than element 66 and is clipped at top and bottom as well. The clipping zones need not be consistent over a document. For example, only some illustrations are delimited by clipping zones. As will be appreciated, a clipping zone can clip one or more of the four sides of the original raster graphic image, and by varying amounts. The image data for the clipped areas not shown is still stored in the PDF file and corresponding XML file.

The way the various elements (TEXT, IMAGE, GROUP, and CLIP) are stored in a PDF file 12 depends on the application used to generate the file, and is not conventional or standardized. The elements corresponding to one image (elements 54, 62, 65, 66, corresponding to image 74 of FIG. 3, for example), are not stored in one specific location in the PDF file 12. These elements may be associated with clipping zones (a page has always a clipping zone), and their sizes are automatically recomputed according to their clipping zones. The exemplary method aims to regroup these elements (text, raster graphic, and vector graphic elements) which compose one single image 74, 76 from the human reader's perspective.

As will be appreciated, while a raster graphic may sometimes be referred to herein as a raster image, it corresponds to the graphical element stored in the PDF file, while an "image" refers to the global image 74 or 76 that the method tries to recognize.

The output of this step is a set of graphical elements 61, 62, 63, 64, 65, 66, 67 and a set of text elements 52, 53, 54, 55, 56, 57, 58, 59, 60 associated with each page 50. For some pages 50, of course, one or both of these sets may be empty.

2. Detection of Page Construct (Graphical) Elements (S106)

Once the locations of various text and graphical elements have been determined (S104), a subsequent step (S106) includes detecting those of the graphical elements which correspond to a part of a page construct 70, 72, such as a page header or a page footer. A page construct graphical element is typically a graphical element which was introduced by the pagination of the document and appears on a plurality of document pages. Such page construct graphical elements can correspond, for example, to logos 67 (raster graphic elements) and/or vector graphic elements such as a simple horizontal rule line 61 which delimits the page header or footer from the page body (FIG. 3). By definition, a page header 70 is located in the top half of a page and a page footer 72 is located in the bottom half. Some pages may have one or both of a page header and footer while some pages may have neither.

U.S. Pat. No. 7,937,653 ("Déjean '653") discloses a global approach for detecting page constructs in a document, but in that case, the page constructs are detected by considering text elements, such as the text of headers and footers. In one embodiment, the exemplary method adapts the method of Déjean '653 to the detection of graphical elements in page constructs. In particular, page construct graphical elements are recognized by computing similarity measures for graphical content over a document under the assumption that the graphical content in the headers and footers is likely to be of higher similarity than the graphical content in the body of the document. Variability in graphical content may be determined for each of a set of vertically spaced positions in the document (shown at the right of the document in FIG. 3) by computing the number of different graphical elements present at a given vertical position for each page over the entire document and expressing this as a percentage of the total number of graphical elements at that position. Positions with a percentage below a threshold are considered as being in a page construct (header and footer content). Then, surrounding positions may be processed to identify the potential limits of the header and footer.

In the present method, similarity is computed by taking a measure suited to graphical elements. For example, the bounding box (after any clipping), of each graphical element is computed and its maximum dimension, given by the maximum of its height and width, is taken as a characteristic of the graphical element. The Euclidean distance of this dimension is then used for computing a similarity measure. The method assumes that a graphical element occurring at the same position in several pages and having the same dimension can be considered as a fixed element and thus likely to be part of a header or footer. In other embodiments, the type of graphical element (e.g., vector graphic or raster graphic) may also or alternatively be considered.

Thus, for example, in FIG. 3, at vertical position 104 from the top of the page, the detector 40 recognizes that an imaginary horizontal line drawn at this position intersects a vector graphic element (the horizontal rule line 61, which delimits the page header from the page body) having a certain dimension D, here its width along the imaginary line. This vector graphic 61 dimension (e.g., D±δ, allowing for a small variability) may occur on several pages of the document in the same position. If the computed variability GVS in detected elements at this position is below a threshold, this signifies the presence of a header 70, since it is located in the upper half of the page. The variability GVS may be computed as follows: The different positions of all the graphic elements in the page are listed. For each of a set of vertical positions P, a computation is performed for associating the number of graphic elements occurring at the position (and optionally the total number of different types of elements occurring at the position) taking into account the whole document, e.g., all or a majority of the pages of the document.

A graphical object variability score GVS can then be computed for each position P:

$$GVS = \frac{\text{No. of different graphic elements at position } P \text{ throughout document}}{\text{Total No. of graphical elements at position } P \text{ throughout the document}}$$

Then, if GVS≤θ, where θ is a threshold variability, position P is considered a part of a page construct and the graphic element(s) at that position is/are considered to be a part of the page construct. Text elements can also be used in the above equation to determine page construct areas.

Suppose for example, that the horizontal line 61 in FIG. 3 (as represented by its dimension D) appears at position 104 on 20 out of 40 pages of the document and there is one other different graphical element at this position P, e.g., a shorter line (not shown) on the single table of contents page of the document. Then variability GVS=2/21=0.095. Suppose that the threshold is 0.2, then the line 61 is considered as part of a page construct as is the line on the table of contents page, because of the low variability at this position. Because of the PDF to XML conversion, there may be some variability in the position of the line 61. For example, it may occur at a vertical position between 102 and 106. The threshold can be adapted depending on the type of document to be handled and the accuracy of conversion process, through experimentation.

Since page constructs, in the case of graphical elements, may include border elements (vertically extending elements down the length of the page, generally restricted to an area close to the margins) as well as or in place of headers and footers, for example, a decorative border of a page, the same procedure can be repeated orthogonally (at 90°) to detect the variability at horizontal positions across the page.

Having detected that element 61 is a graphical page construct element, it can be removed from the set of graphical elements under consideration for the page 50, and from other pages on which it appears, for the remaining steps of the method. As will be appreciated, the rule line 61 is used as a delimitation between the page header 70 and the body of the page and, if not eliminated as a candidate image element, may be considered as part of the image 74, for example. Element 67 is also determined to be a page construct graphical element and similarly removed from further consideration as it is determined to be in a footer.

3. Detection of Tables and Textual Frames (S108)

In this step, text formatting elements are identified and eliminated from further consideration as elements of candidate images.

Tables (where text is arranged in an array of cells and may include column or row titles) and text boxes (text delimited by a rectangle) may use vector graphics. For example, a table may have a rectangular border drawn around the entire table and/or lines between the cells, etc, or a solid rectangle of a contrasting color over all or part of the table. In one embodiment, these graphical elements are identified and removed from further consideration, as for the graphical page construct elements. In one embodiment, tables in the page 50 are first detected. Vector graphics (e.g., lines) corresponding to the edges of a cell of the table or which surround a single text box are detected and excluded from further consideration. The detection of such vector graphics can be performed using the method of above-mentioned U.S. Pat. No. 7,739,587, for example. Briefly, this step of the method includes converting line graphics that are adjacent to a text element into vectors having a canonical form without vector overlaps or crossings and then associating connecting vectors (i.e., two forking vectors having a common starting point or two meeting vectors having a common ending point). A set of vectors including at least two forking vectors and two meeting vectors cooperatively defining a cell around (or intersecting) a text element of a table or text box can then be identified and removed from consideration as a candidate image element.

In other embodiments, the detection of tables is not performed, and tables delimited by graphical elements may simply be considered as images.

4. Segmentation of Graphical Elements (S110)

Figure 8:
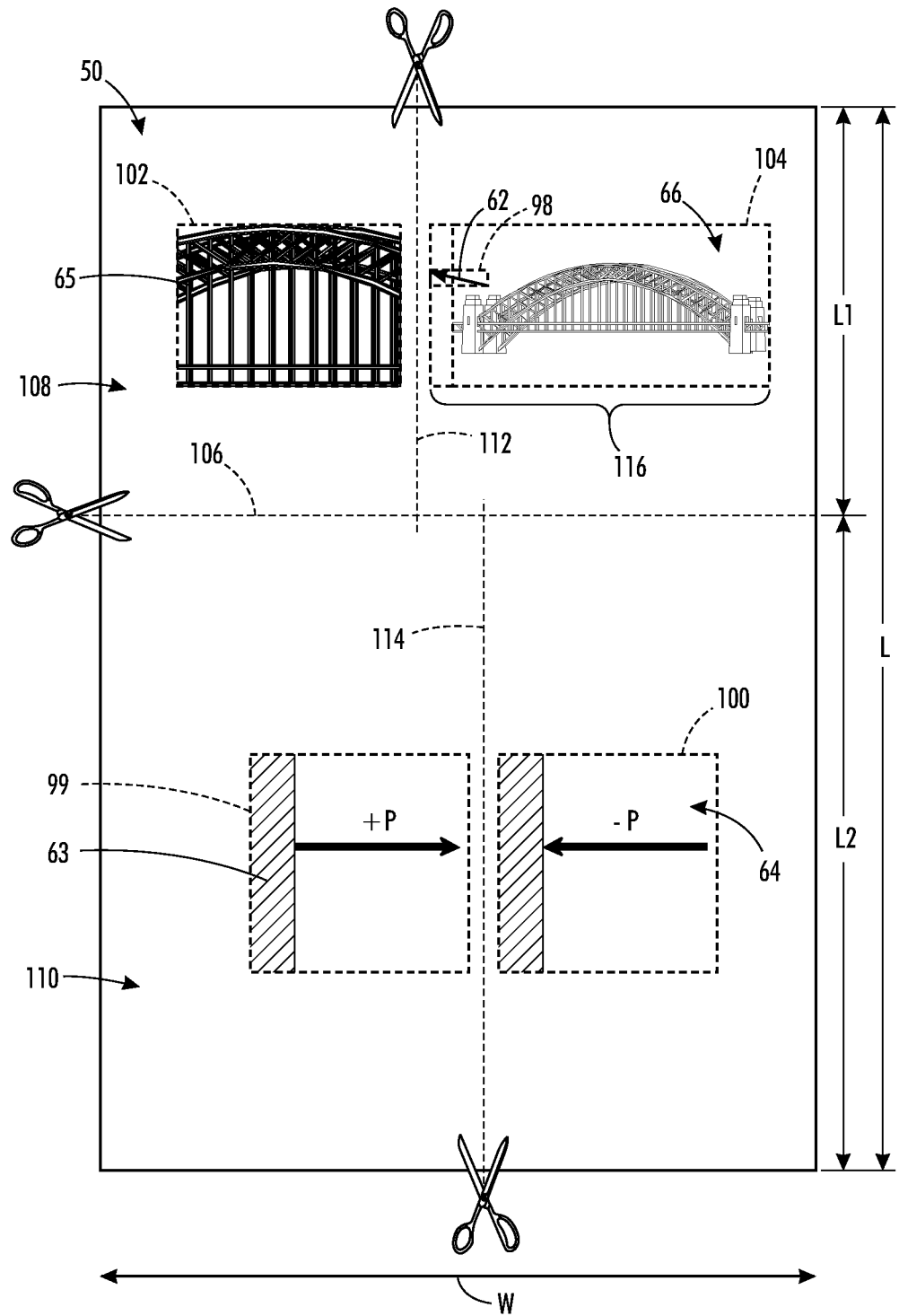
FIG. 8 illustrates segmentation of graphical content of a page after page construct graphical elements have been excluded from consideration.

After removal of page construct graphical elements, and/or table and/or text box graphical elements, only the remaining graphical elements on the page, if any, are considered in this step. The segmenter 44 segments the remaining graphical elements 62, 63, 64, 65, 66 on the same page into one or more groups constituting image blocks based on the graphical elements and the white space identified between them. Two approaches are possible: a top-down segmentation (starting from the whole page and sub-segmenting) and a bottom-up one (agglutinating narrow elements). An algorithm for implementing a top-down approach is described, for example, in U.S. Pat. No. 7,392,473. The exemplary algorithm segments a page using horizontal and vertical white spaces. In the '473 patent, the algorithm is used for textual ordering. In the exemplary embodiment, however, bounding boxes 68, 69, etc. of only the remaining graphical elements 62, 63, 64, 65, 66 are used as information for the segmentation (i.e., not the eliminated graphical elements). In the exemplary embodiment, text elements are not considered in the segmentation, i.e., text elements are ignored. The bounding box of a vector graphic instruction group 62, 63, or 64 is approximated by using the smallest bounding rectangle which contains all the instructions in a group (see for example, the dotted lines 98, 99, 100 in FIG. 8). Thus, for example, the bounding box of a triangle can be approximated by its bounding rectangle. The clipping information, if any, is also used in order to shrink the bounding box 102, 104 of the graphical elements, as for raster graphics 65, 66. Segmentation cuts the page into zones by creating imaginary cuts along horizontal and/or vertical regions 105 of white space, i.e., regions without "on" pixels that exceed a certain threshold width (shortest dimension).

As will be appreciated, S110 is not needed when there is no more than one graphical element remaining on a page. In other cases, an exemplary segmentation method for identifying image blocks each comprising one or more graphical elements, will now be described. This method is illustrated for the residual graphical elements in FIG. 8, by way of example, and may include:

(a) assigning a page 50 of the document to be a rectangular block having a width W along a first direction and a length L along a second direction, perpendicular to the first direction. The block has a plurality of remaining graphical elements 62, 63, 64, 65, 66 (and textual elements) arranged therein;

(b) identifying a first set of hypothetical cuts 106, substantially between boundaries 98, 99, 100, 102, 104 of the graphical elements, each of the hypothetical cuts spanning the width W of the block. The first set of hypothetical cuts define a set of sub-blocks 108, 110, with each sub-block having a width W along the first direction and a length L1, L2, etc. along the second direction;

(c) identifying a second set of hypothetical cuts 112, 114 substantially between boundaries of the graphical elements, that each span the length L1, L2 of a sub-block in the set of sub-blocks. The second set of hypothetical cuts define a set of sub-blocks, with each sub-block having a width <W along the first direction and a length L1 or L2 (assuming that a first hypothetical cut has been made), along the second direction;

(d) optionally, computing arrangement criteria of the graphical elements ordered according to the first and the second sets of hypothetical cuts;

(e) optionally, modifying cuts in the first and second sets of hypothetical cuts, using the computed arrangement criteria, to merge cuts that span two or more sub-blocks along the second direction by removing one cut in the first set of hypothetical cuts and combining two cuts in the second set of hypothetical cuts (not illustrated in FIG. 8); and (f) determining a set of image blocks using those cuts between graphical elements in the page block that remain in the first and second sets of hypothetical cuts after performing (e). Note that steps (d) and (e) can be omitted, i.e., (f) can follow (c) Each image block is defined by the smallest rectangle encompassing the graphical elements therein. In the illustrated example, the image blocks correspond in shape and size to the three bounding boxes 99, 100, 102, and a fourth image block 116, which encompasses graphical elements 62 and 66.

The resulting segmentation provides good results, except in cases such as diagrams, which contain relatively large whitespaces in them, as for vector graphic element groups 63, 64, which at this point, are considered as two separate image blocks 99, 100. The method may also consider raster graphic 65 as being in a separate image block 102 from image block 116 in this example.

The output of this step is a set of image blocks 99, 100, 102, 116, each comprising at least one graphical element.

5. Detection of Text Elements Linked to Graphical Elements (S112)

Figure 9:
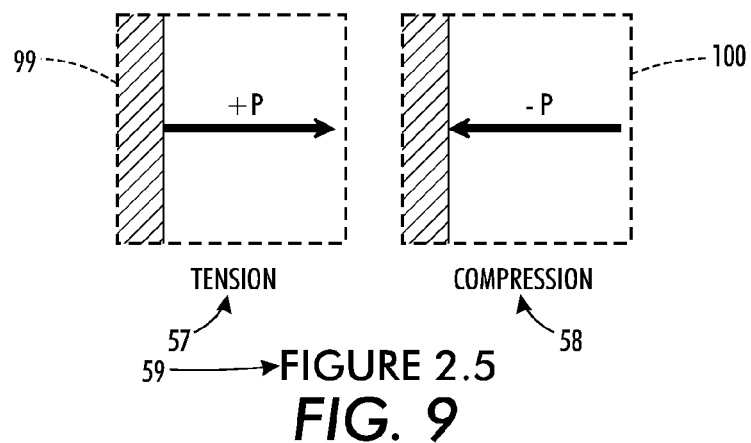
FIG. 9 illustrates two image blocks identified for the page of FIG. 3, and proximate text elements.

In this step, textual content which is likely to be a caption for an image is identified. By "caption," it is meant text which can be associated with an image block by automatic methods. In general, captions describe the content of an image and/or text within an image or which can be otherwise related to an image, and is thus not limited solely to the conventional understanding of the word caption. A method for identifying captions which can be used herein is described in above-mentioned U.S. Pat. No. 7,852,499. Briefly, in the exemplary embodiment, text features of text elements proximate the image block in question are considered in determining whether a text element should form part of a candidate image comprising the image block. A text element may be assigned as proximate, e.g., given a value of 1 for example, if it is within a predetermined distance from an adjacent image block 99, 100, 102, 116, and/or closer to that image block than to any other. This is opposed to a different value, e.g., 0, for a text element which is remote and therefore ignored. For example in the case of image blocks 99 and 100, shown in FIG. 9, the text elements 57 and 59 are considered as candidate captions for image block 99 and the text elements 58 and 59 are considered as candidate captions for image block 100. Regularities over the document can then be used to identify text which is commonly linked to an image. Features of the text elements 57, 58, 59 which can be considered in determining whether these text elements should be linked to a respective image block can include font type (Arial, Courier, etc.), font style (bold, italic) font size, font color, textual content and the like. For example for the text element "FIGURE 2.5", one or more of the font style, font type and regular use of the word "FIGURE" can be used to predict that this text is indeed an image caption, by comparing these features with the features of other text elements that are proximate other image blocks throughout the document.

To compute the likelihood that a text element is a caption, a representation of each text element is computed which is based on its identified features. For example the text element representation can be a single value or a set of values, one for each of a set of features, e.g., in the form of a multi-element vector. Each feature can thus have a value in the vector. The representation is compared with representations of other text elements throughout the document or with a set of predefined caption representations to determine whether the text element should be considered a caption for the image block to which it is proximate. For example, a score can be computed for each text element indicative of a strength of association of its representation with other text elements throughout the document which have also been considered as proximate to an image block. In computing similarity, some elements of the vector may be weighted to emphasize their relative importance.

Consider, for example, that there are a number of text elements in the document that use Arial size 14 that are also proximate a respective image block and a large number of text elements that are not proximate an image block which use a different font and/or size. In this case, it can be assumed that the text element in question, that uses Arial size 14, is likely a caption for its proximate image block.

The exemplary method thus allows for the detection of text elements that are related to graphical elements by detecting regularities of co-occurrences. These text elements can correspond to text elements present in a diagram, but also captions. In other embodiments, text elements that are wholly (or perhaps partially) within an image block need not be processed in this way. For example, the text elements "+P" and "−P" are readily assigned to their respective image blocks 99, 100, as they fall within the respective boundaries, and thus their features do not really need to be considered.

Figure 10:
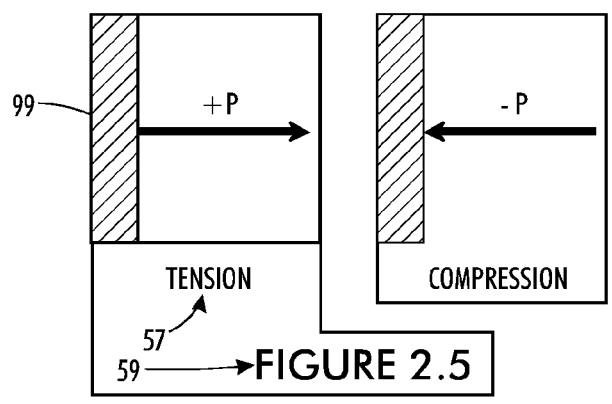
FIG. 10 illustrates linking the text elements of FIG. 9 to a proximate image block.

Each caption or other text element which meets the test for a related text element is then linked to a respective single image block 99, 100. Thus, as illustrated in FIG. 10, text elements 57 and 59 are linked to image block 99 and text element 58 is linked to image block 100. No text element is linked to more than one image block. Thus, for example, if text element 59 is equidistant from blocks 99, 100, it is linked to only one of the two blocks 99.

Figure 11:
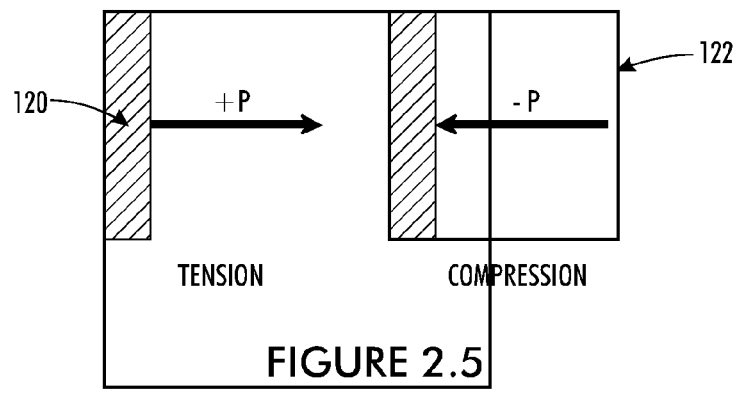
FIG. 11 illustrates generation of sub-images with overlapping bounding boxes surrounding the linked text and graphical elements of FIG. 10.

A new bounding box 120, 122, which can be the smallest rectangle to encompass the image block and any respective text elements(s) linked to it, is then generated, as illustrated in FIG. 11. The "image" contained within this bounding box may be a sub-image or an entire image, and thus can be considered a candidate image at this stage.

6. Correction of Over-Segmented Images Using Text Elements (S114)

Under-segmentation (incorrect merging of two different images) in S110 is rare when the images have captions. The distance between two images is generally large enough in such a case since captions are, in that step ignored, and thus correspond to whitespace.

Figure 12:
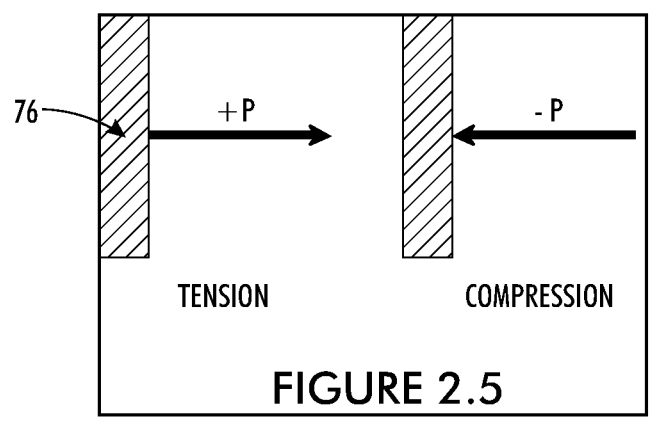
FIG. 12 illustrates merging of sub-images, where due to the overlap generated by its caption, one sub-image is merged with a second sub-image, thus providing a correct segmentation.

The main segmentation error likely to occur is, therefore, over-segmentation of an image which contains a large amount of white space between the image blocks, as in the case of image 76. The use of the text element can solve most of the errors. Specifically, having computed a bounding box 120, 122 containing the graphical element(s) and the associated text element(s) of a given image block, bounding boxes containing graphical and text element(s) (or graphical element(s) only) which overlap, at least partially can be identified, as is the case for bounding boxes 120, 122 in FIG. 11. These two overlapping candidate images, which may be "sub-images" can be merged to form a single new image 76, as shown in FIG. 12. This provides the correct segmentation—i.e., what a viewer would consider as being an image together with a relevant caption suitable for extraction from the rest of the page for presentation as an image. A similar segmentation process results in the generation of image 74 from two sub-images.

Figure 13:
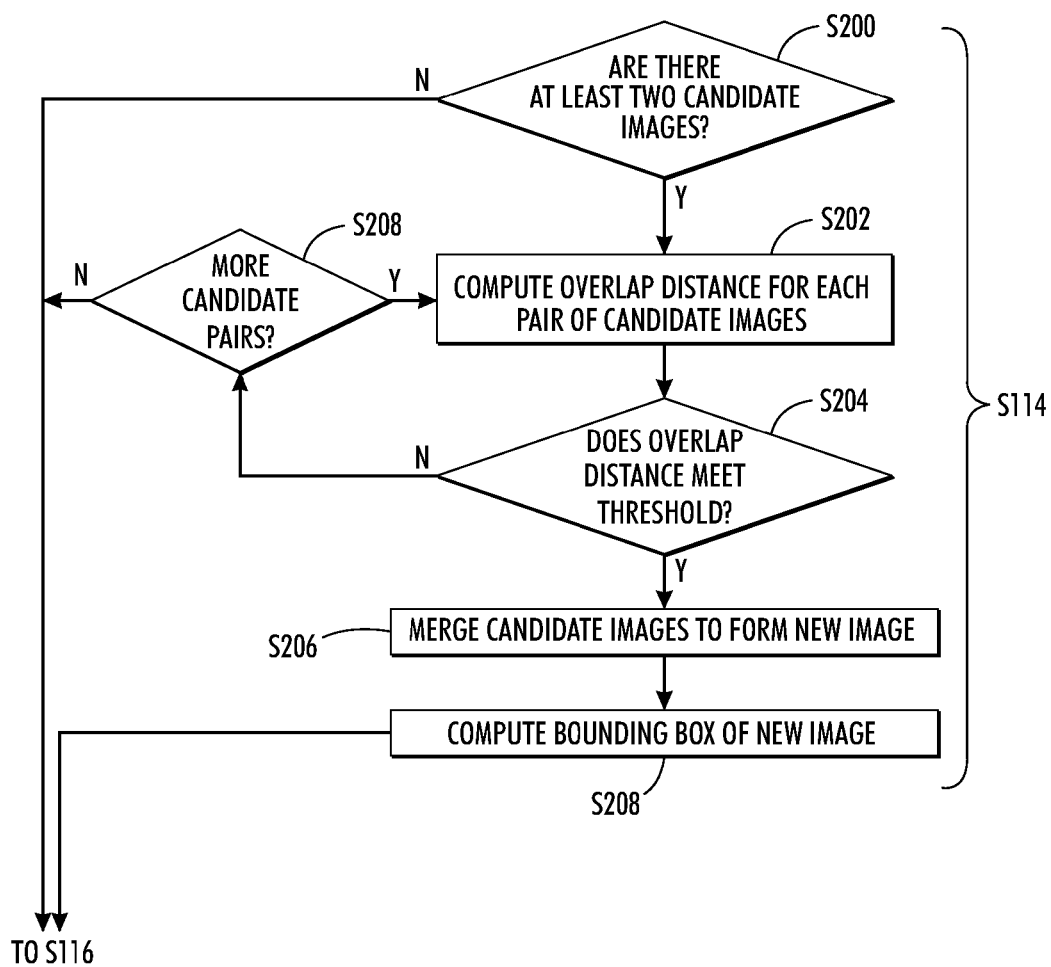
FIG. 13 illustrates steps of the exemplary merging method.

The method at step S114 can thus proceed as shown in FIG. 13, as follows:

At S200, a determination is made as to whether there are at least two candidate images. If not, the method proceeds to S116, where a single candidate image is considered as an image.

If yes, at S202, for each pair of candidate images on a page, an overlap distance is computed (this computation may be reduced by only computing whether there is an overlap when at least one of the pair of candidate images has had its bounding box increased in size by the association of one or more related text elements at S112).

If at S204, the computed overlap distance meets a predetermined threshold, the method proceeds to S206, otherwise the method proceeds to S208, for any remaining pairs of candidate images.

At S206, candidate images which overlap are merged to form an image which includes all of the graphical and text elements of the merged candidate images. The bounding box of the new image is defined by the smallest rectangle which includes all of its elements. More than two candidate images may be merged into a single new image 74, 76 where the distance between any one of the candidate images to be merged and another candidate image satisfies the threshold.

The new image's bounding box location and size are computed and stored at S210.

For identifying any overlap between two candidate images i1, i2, the distance between the two images can computed at S202 with the formula:

$$dist(i1, i2) = \left(1 - 2\frac{\text{overlap}(i1, i2)}{\text{area}(i1) + \text{area}(i2)}\right) < \Theta$$

where overlap (i1, i2) is the area of overlap of the bounding boxes 120, 122 of the two candidate images i1, i2 and area(i1) and area(i2) are the respective areas of the two candidate images.

If there is no overlap between two images, the value of the dist(i1,i2) formula is equal to 1. If both images have the same position and size, the value equals 0. In order to cope with a small amount of approximation in the bounding box computation, if the computed dist(i1,i2) is less than a selected threshold value $\Theta$, then the two images are considered to be overlapping. To identify a suitable threshold value $\Theta$, several values can be tested on a labeled image set to evaluate precision and recall, and an optimal one of the values may be adopted for use in the equation.

The identified images 74, 76 formed by merging, or other candidate images identified as being images not to be merged, can be labeled, e.g., using Support Vector Graphics (SVG). The identified images can be extracted from the PDF files, used to process the document, or otherwise employed.

Without intending to limit the scope of the exemplary embodiment, the following example demonstrates the effectiveness of the system and method.

EXAMPLE

Since there is no available dataset for evaluating the exemplary method, an approximated ground-truth dataset was created using PDF files. A clipping zone is associated with some graphical elements of some of the files. This clipping zone corresponds to the bounding box of the (global) image. For such PDF files, these clipping zones are extracted as ground-truth. The clipping zone corresponding to the entire page is systematically ignored, and clipping zones that are too small are also ignored. This creates a fairly accurate ground-truth (with some small errors). Only graphical elements occurring in a page with such clipping zones are evaluated (ignoring, for this experiment, pages with two images and where only one has a clipping zone). The accuracy of this ground-truth is satisfactory for evaluating which steps of the method are most useful. The evaluation was carried out with a fairly challenging document containing around 800 diagrams (including tables, charts, raster and vector graphics mixed with text).

Configurations of the method were evaluated using various combinations of S106 (page construct elimination), S110 (segmentation), S112 (caption detection), and S114 (over segmentation correction) in the method shown in FIG. 2, following S104. Removal of text formatting elements (S108) was not employed in this example.

The configurations were as follows:
1. Basic: only S110 is performed.
2. HF+Basic: only S106 and S110 are performed.
3. Caption: only S110 and S112 are performed.
4. HF+caption: all the steps are performed (S106, S110, S112, S114).

Figure 14:
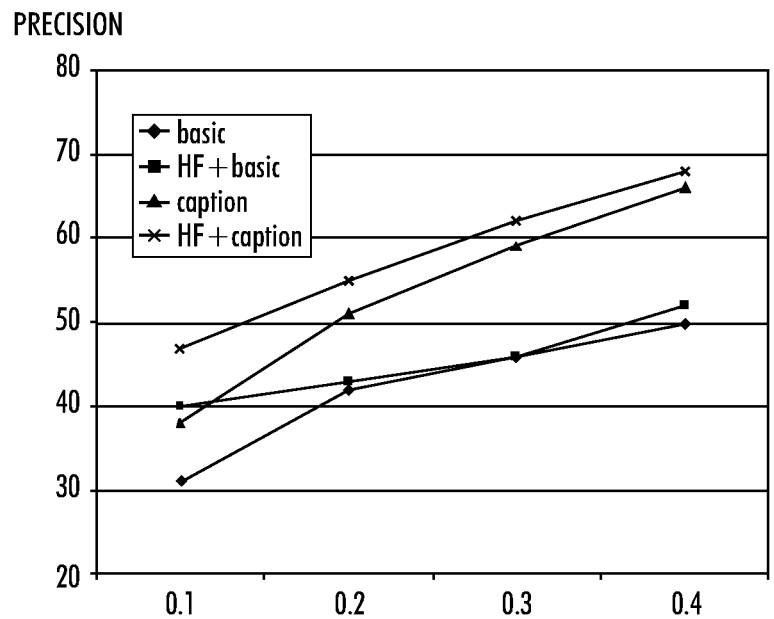
FIG. 14 is a plot of precision vs. threshold for overlap, $\Theta$, for different segmentation methods.
Figure 15:
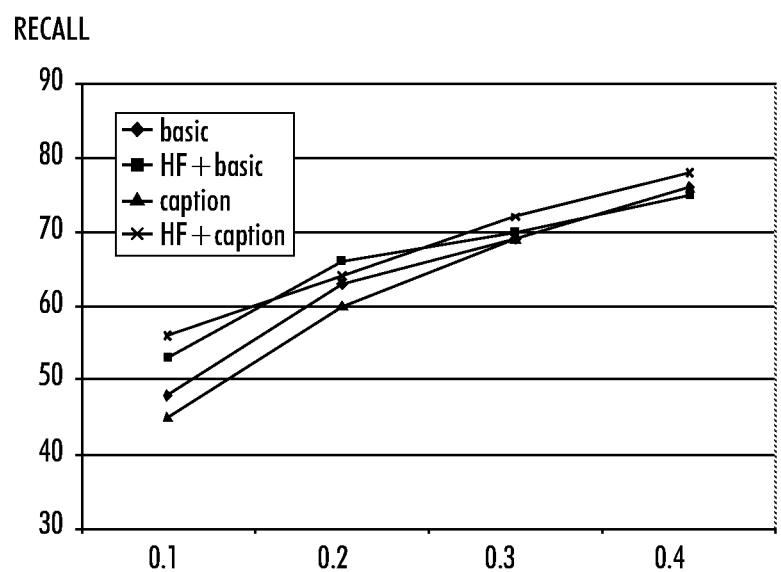
FIG. 15 is a plot of recall vs. $\Theta$ for different segmentation methods.

Different values of the overlap threshold were evaluated $\Theta$. FIG. 14 shows Precision obtained with the different configurations with $\Theta$=[0.1, 0.2, 0.3, 0.4]. FIG. 15 shows Recall obtained with the different configurations with $\Theta$=[0.1, 0.2, 0.3, 0.4]. Here, Precision is the proportion of correctly merged image pairs, based on the ground truth, among those the algorithm has chosen to merge, expressed as a percentage. Recall is the proportion of correctly merged image pairs among those which actually should have been merged, based on the ground truth, expressed as a percentage.

The values for $\Theta$ are given by the x-axis. The evaluation shows that the HF+caption combination (all the steps) performs consistently better than the other alternatives, especially regarding Precision. The main errors are due to text elements wrongly attached to some images.

To compare with OCR, the FineReader OCR engine was used. The same PDF file was used with this engine, and the detected images were evaluated using the same ground-truth. Precision and recall remain null even with $\theta$=0.5. To be fair, this document is challenging for OCR engines without tuning. A zoning step, which creates textual and non-textual zones, is extremely difficult with diagrams, due to the presence of white zones (most zoning approaches use a bottom-up algorithm with connected components).

The above example demonstrates that with ground truth constructed from available clipping information, the exemplary method shows good results on PDF documents.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for detecting images in an electronic document comprising:
   receiving an electronic document comprising a plurality of pages;
   for each of at least one of the pages of the document:
   identifying elements of the page, comprising identifying a set of graphical elements and identifying a separate set of text elements;
   providing for identifying and excluding, from the set of graphical elements, graphical elements which serve as graphical page constructs, including, for a set of pages of the document, identifying positions in the document pages where graphical elements have a higher similarity than in other positions of the document pages, and identifying graphical elements at those positions as graphical page constructs;
   segmenting the page, based on remaining graphical elements in the set of graphical elements to generate a set of image blocks, each of the image blocks comprising at least one of the graphical elements;
   computing whether a text element from the set of text elements of the page is associated with a respective image block in the set of image blocks of the page;
   forming candidate images, each candidate image comprising an image block and, for a text element from the set of text elements which is determined to be associated with a respective image block, a respective one of the candidate images further including the associated text element; and
   for a pair of the candidate images which are determined to be overlapping, grouping the pair of overlapping candidate images to form a new image.

2. The method of claim 1, further comprising, prior to the segmenting, excluding, from the set of graphical elements, graphical elements which are identified as text formatting elements.

3. The method of claim 2, wherein the text formatting elements comprise raster graphic elements associated with a table or text box.

4. The method of claim 1, wherein the graphical elements are selected from raster graphic elements and vector graphic elements.

5. The method of claim 1, wherein the electronic document is a page description language document.

6. The method of claim 1, wherein the page description language document is a PDF or Postscript file.

7. The method of claim 1, wherein the computing whether a text element from the set of text elements is associated with a respective image block in the set of image blocks includes identifying a text element that is proximate one of the image blocks and which has features which are similar to features of text elements on other pages of the document which are proximate respective image blocks.

8. The method of claim 1, wherein in the computing whether a text element from the set of text elements is associated with a respective image block, no text element in the set is associated with more than one of the candidate images for the page.

9. The method of claim 1, wherein the forming candidate images includes identifying a bounding box for each candidate image, and for candidate image with an associated text element, the bounding box for the respective candidate image surrounding the image block and its associated text element.

10. The method of claim 1, wherein the grouping of the pair of overlapping candidate images to form an image comprises computing an overlap between a bounding box of a first of the candidate images and a bounding box of a second of the candidate images.

11. The method of claim 10, wherein the computing of the overlap comprises determining whether an overlap distance meets a predetermined threshold.

12. The method of claim 1, further comprising, for any of the candidate images which are determined not to be overlapping, identifying the candidate images as respective images.

13. The method of claim 1, further comprising labeling the new image in the document.

14. The method of claim 1, further comprising extracting the new image from the document.

15. The method of claim 1, wherein the identifying elements of the page includes identifying a position and size of each of the graphical elements and where a graphical element is associated with a clipping zone, the clipping zone is used to identify the position and size of the graphical element.

16. The method of claim 1, wherein at least one of the identifying elements, segmenting the page, computing whether a text element from the set of text elements is associated with a respective image block, forming candidate images and grouping of overlapping candidate images is performed with a computer processor.

17. The method of claim 1, further including identifying and excluding graphical elements which serve as text formatting elements and ignoring the identified excluded text formatting elements in the segmenting of the page.

18. A system for detection and extraction of images in an electronic document comprising:
memory which store instructions for performing the method of claim 1; and
a processor in communication with the memory for implementing the instructions.

19. A computer program product comprising anon-transitory recording medium storing instructions, which when executed by a computer, perform the method of claim 1.

20. A computer-implemented system for detecting images in electronic documents comprising:
computer memory which stores:
a graphical page constructs detector configured for identifying graphical elements of a page of an electronic document which serve as graphical page constructs, each of the graphical elements identified as a graphical page construct appearing on at least several pages of the document, the identifying including, for a set of pages of the document, identifying positions in the document pages where graphical elements have a higher similarity than in other positions of the document pages, and identifying graphical elements at those positions as graphical page constructs;
a graphical element segmentor which segments the page to generate a set of image blocks, each of the image blocks comprising at least one of the graphical elements, the segmentation of the page excluding any graphical elements that were identified by the graphical page constructs detector as serving as a page construct;
a related text detector configured for associating text elements from a set of text elements for the page with respective image blocks in the set of image blocks; and
a refinement module for forming candidate images, each candidate image comprising an image block and any text elements from the set of text elements which are determined to be associated with that image block and for grouping any candidate images which overlap to form a new image; and
a processor which implements the graphical page constructs detector, graphical element segmentor, related text detector, and refinement module.

21. The system of claim 20, further comprising a text formatting elements detector which identifies graphical elements which serve as text formatting elements, the segmenting further excluding graphical elements which have been identified as serving as text formatting elements.

22. The system of claim 20, further comprising a graphical user interface which displays the new image.

23. The system of claim 20, further comprising a processor which implements the graphical page constructs detector, graphical element segmentor, related text detector and refinement module.

24. The system of claim 20, further comprising a conversion module which converts a received document into a markup language document.

25. A method for detecting images in an electronic document comprising:
for each page of a plurality of pages of an electronic document:
identifying elements of the page, the elements comprising a set of graphical elements and a set of text elements;
providing for detecting at least one of:
any of the graphical elements which are determined to serve graphical page constructs, by identifying graphical elements which appear on at least several pages of the document, and
any of the graphical elements which are text formatting elements, which comprise vector graphic elements identified as forming a part of a table or text box;

automatically excluding, from the set of graphical elements for the page, any of the graphical elements which are determined to serve as at least one of graphical page constructs and text formatting elements;

thereafter, segmenting the page, based on only the remaining graphical elements in the set of graphical elements, after excluding the graphical elements which are determined to serve as at least one of the graphical page constructs and the text formatting elements, to generate a set of image blocks, each of the image blocks comprising at least one of the remaining graphical elements;

automatically associating any text elements from the set of text elements with respective image blocks in the set of image blocks which are determined to serve as captions for the respective image blocks, wherein no text box is associated with more than one respective image block;

forming candidate images, each candidate image comprising one of the image blocks and its caption, if any;

computing overlap between candidate images arising from the association of a caption with an image block; and grouping any candidate images which are determined to have an overlap to form a new image.

26. The method of claim 25, wherein the method includes, prior to the segmenting, excluding from the set of graphical elements the graphical elements which are determined to serve as graphical page constructs.

27. The method of claim 25, wherein the excluding of the graphical elements which are graphical page constructs includes, for a set of pages of the document, providing for identifying positions in the document pages where graphical elements have a higher similarity than in other positions of the document pages, and for identifying graphical elements at those positions as graphical page constructs.

* * * * *